United States Patent
Tsou et al.

(10) Patent No.: US 9,672,421 B2
(45) Date of Patent: Jun. 6, 2017

(54) METHOD AND APPARATUS FOR RECORDING READING BEHAVIOR

(71) Applicant: UTECHZONE CO., LTD., New Taipei (TW)

(72) Inventors: Chia-Chun Tsou, New Taipei (TW); Po-Tsung Lin, New Taipei (TW); Chia-Wen Kao, New Taipei (TW)

(73) Assignee: UTECHZONE CO., LTD., New Taipei (TW)

( * ) Notice: Subject to any disclaimer, the term of this patent is extended or adjusted under 35 U.S.C. 154(b) by 426 days.

(21) Appl. No.: 14/179,555

(22) Filed: Feb. 13, 2014

(65) Prior Publication Data

US 2015/0097938 A1 Apr. 9, 2015

(30) Foreign Application Priority Data

Oct. 4, 2013 (TW) .............................. 102136043 A

(51) Int. Cl.
 *G06T 7/00* (2017.01)
 *G06K 9/00* (2006.01)
 *G06T 7/246* (2017.01)

(52) U.S. Cl.
 CPC .......... *G06K 9/00604* (2013.01); *G06T 7/246* (2017.01); *G06T 2207/30041* (2013.01); *G06T 2207/30241* (2013.01)

(58) Field of Classification Search
 CPC ...... G06K 9/00604; G06T 2207/30241; G06T 2207/30041; G06T 7/2033
 USPC ............................................. 345/156; 348/78
 See application file for complete search history.

(56) References Cited

U.S. PATENT DOCUMENTS

| 7,429,108 B2 | 9/2008 | Rosenberg |
| 7,789,511 B2 | 9/2010 | Aoki et al. |
| 8,271,865 B1 | 9/2012 | Bennett |
| 9,026,934 B1* | 5/2015 | Shah ..................... G06F 3/0483 715/776 |
| 2003/0210226 A1* | 11/2003 | Ho ........................ G06F 3/0483 345/156 |
| 2004/0174496 A1* | 9/2004 | Ji ............................ G06F 3/013 351/209 |

(Continued)

FOREIGN PATENT DOCUMENTS

| CN | 100338556 | 9/2007 |
| CN | 102087582 | 8/2012 |

(Continued)

OTHER PUBLICATIONS

Brooks et al. "Perceptions of Interfaces for Eye Movement Biometrics". 2013 International Conference on Biometrics (ICB). Jun. 2013, pp. 1-8.*

(Continued)

*Primary Examiner* — Zhihan Zhou
(74) *Attorney, Agent, or Firm* — Jianq Chyun IP Office

(57) ABSTRACT

A method and an apparatus for recording reading behavior are provided. A movement trajectory of a user's eye is tracked based on an eye-tracking procedure, so as to calculate reading time of a gazing part of an electronic document when it is detected that sight of an eye leaves the gazing part, or when it is detected that the eye keeps gazing the electronic document and reading of the gazing part is finished. And the reading time is recorded to a storage space corresponding to the gazing part.

17 Claims, 4 Drawing Sheets

(56) References Cited

U.S. PATENT DOCUMENTS

| | | | | |
|---|---|---|---|---|
| 2006/0256083 A1* | 11/2006 | Rosenberg | ............ | G06F 3/013 345/156 |
| 2013/0054622 A1 | 2/2013 | Karmarkar et al. | | |
| 2014/0125585 A1* | 5/2014 | Song | ...................... | G06F 3/013 345/156 |
| 2014/0325407 A1* | 10/2014 | Morris | ................ | G06F 3/04842 715/765 |
| 2014/0365875 A1* | 12/2014 | De Assuncao | ..... | G06Q 30/0601 715/251 |

FOREIGN PATENT DOCUMENTS

| | | | | |
|---|---|---|---|---|
| CN | WO 2012174743 A1 * | 12/2012 | ............ | G06F 3/013 |
| CN | 102081503 | 6/2013 | | |
| CN | 103268152 | 8/2013 | | |
| CN | 103336576 | 10/2013 | | |
| JP | 2002132632 | 5/2002 | | |
| JP | 2007213469 | 8/2007 | | |
| JP | 2012063899 | 3/2012 | | |
| JP | 2012098930 | 5/2012 | | |
| JP | 2013003740 | 1/2013 | | |
| TW | I398796 | 6/2013 | | |

OTHER PUBLICATIONS

"Office Action of Japan Counterpart Application", issued on Nov. 10, 2015, p. 1-p. 4, in which the listed references were cited.
"Office Action of Taiwan Counterpart Application", issued on Jan. 23, 2015, p. 1-p. 10, in which the listed references were cited.
"Office Action of China Counterpart Application," issued on Feb. 7, 2017, p1-p9, in which the listed reference was cited.

* cited by examiner

| Chapter | Reading status | Reading time | User |
|---|---|---|---|
| First chapter | 100% | 10:05 | A |
| Second chapter | 100% | 17:00 | B |
| Third chapter | 67% | 8:45 | C |
| Fourth chapter | — | — | — |

FIG. 6B

| Chapter | Reading status | Reading time |
|---|---|---|
| First chapter | 100% | 8:55 |
| Second chapter | 100% | 15:16 |
| Third chapter | 89% | 10:05 |
| Fourth chapter | — | — |

FIG. 6C

METHOD AND APPARATUS FOR RECORDING READING BEHAVIOR

CROSS-REFERENCE TO RELATED APPLICATION

This application claims the priority benefit of Taiwan application serial no. 102136043, filed on Oct. 4, 2013. The entirety of the above-mentioned patent application is hereby incorporated by reference herein and made a part of this specification.

BACKGROUND

Technical Field

The invention relates to a method and an apparatus for browsing an electronic document. Particularly, the invention relates to a method and an apparatus for recording reading behaviour based on an eye-tracking application.

Related Art

Along with digitization of information, more and more conventional information interfaces are replaced by electronic products. For example, digital photo frames and digital cameras are used to replace conventional photos and films, and electronic products such as personal digital assistants (PDAs), smart phones, readers, etc. become document reading platforms of a new generation. The user may store a plurality of electronic documents such as e-books, etc. in a same portable electronic product, which mitigate the inconvenience of carrying conventional paper-made books. Moreover, the user can view the e-books through the portable electronic product at any time.

Presently, a plurality of control methods of e-book has been developed. For example, U.S. Pat. No. 7,429,108 (patent document 1) provides a method for marking a reading position. The patent document 1 provides an electronic reader recorder using gaze-tracking applications, which helps the user to find a paragraph read last time. Moreover, U.S. Patent No. US2013/0054622 (patent document 2) provides a method of scoring a file by analyzing an eye movement trajectory. The patent document 2 sorts files according to the eye movement trajectory of the user. When the user performs retrieval, the system scores the retrieved files according to user interest characteristic parameters, and sorts the retrieved files according to the scores.

SUMMARY

The invention is directed to a method and an apparatus for recording reading behaviour, by which a reading time is recorded based on eye-tracking analysis.

The invention provides a method for recording reading behaviour, which includes following steps. An electronic document is displayed on a display unit, where the electronic document includes a plurality of parts. An image sequence of a user is captured through an image capturing unit. An eye-tracking procedure is executed on the image sequence to track a movement trajectory of an eye of the user. When it is detected that the eye gazes a gazing part of the parts, it is detected whether a sight of the eye leaves the gazing part. When it is detected that the sight of the eye leaves the gazing part, a reading time of the gazing part is calculated. When it is detected that the eye keeps gazing the electronic document and reading of the gazing part is finished, the reading time of the gazing part is calculated. The reading time is recorded to a storage space corresponding to the gazing part.

The invention provides an apparatus for recording reading behaviour including a display unit, an image capturing unit, a storage unit and a processing unit. The display unit is used for displaying an electronic document, where the electronic document includes a plurality of parts. The image capturing unit is used for capturing an image sequence of a user. The storage unit is used for storing the electronic document and the image sequence. The processing unit is coupled to the display unit, the image capturing unit and the storage unit, and executes an eye-tracking procedure on the image sequence to track a movement trajectory of an eye of the user. When the processing unit detects that the eye gazes a gazing part of the parts, the processing unit detects whether a sight of the eye leaves the gazing part. When the processing unit detects that the sight of the eye leaves the gazing part, the processing unit calculates a reading time of the gazing part, and records the reading time to a storage space corresponding to the gazing part. When the processing unit detects that the eye keeps gazing the electronic document and reading of the gazing part is finished, the processing unit calculates the reading time of the gazing part, and records the reading time to a storage space corresponding to the gazing part.

In an embodiment of the invention, the apparatus for recording reading behaviour further includes a behaviour analysis module, which is driven by the processing unit, and includes an eye-tracking module, a timing module, and a recording module, where the eye-tracking module executes the eye-tracking procedure on the image sequence to track the movement trajectory of the eye of the user; the timing module calculates the reading time; and the recording module records the reading time.

In an embodiment of the invention, the behaviour analysis module further includes a correction module. The correction module sequentially receives a plurality of correction images, where the correction images are respectively obtained when the user views a plurality of correction points of the display unit, and a reference correction parameter is obtained according to two bright spot positions in an eye area of each of the correction images, where the two bright spot positions are formed when the image capturing unit captures each of the correction images, and a coordinate transformation matrix is generated based on the correction images according to a perspective transformation method, where the coordinate transformation matrix is used for transforming a coordinate position of the eye area into a coordinate position of the display unit.

In an embodiment of the invention, the eye-tracking module detects the eye area of a current image in the image sequence to obtain a pupil position in the current image; obtains a comparison correction parameter according to the two bright spot positions in the eye area of the current image; obtains a dynamic compensation parameter according to the reference correction parameter and the comparison correction parameter; calculates eye movement coordinates according to one of the two bright spot positions and the pupil position in the current image and the dynamic compensation parameter; converts the eye movement coordinates into sight landing coordinates corresponding to the display unit by using the coordinate transformation matrix, and records the sight landing coordinates.

In an embodiment of the invention, the behaviour analysis module further includes a document trimming module. The document trimming module calculates a current read ratio of the gazing part according to sight landing coordinates where the sight of the eye finally stays. The recording module further records the current read ratio of the gazing part and the sight landing coordinates where the sight of the eye finally stays to the storage space corresponding to the gazing part when it is detected that the sight of the eye leaves the gazing part, and reading of the gazing part is not finished. Moreover, the document trimming module further determines whether reading of the gazing part is finished according to the sight landing coordinates. When it is detected that the eye keeps gazing the electronic document, and reading of the gazing part is finished, the timing module sums all of the reading time of the gazing part according to the recorded reading time.

In an embodiment of the invention, the recording module further records reading frequency of each part.

In an embodiment of the invention, the behaviour analysis module further includes an identification module, which is used for identifying an identity of the user, and determining whether identification information corresponding to the user exists in a database, where when the identification information corresponding to the user does not exist in the database, the identification module records the identification information and establishes the storage space corresponding to the identification information.

In an embodiment of the invention, the behaviour analysis module further includes a prompt module. The prompt module is used for displaying the reading time, a read ratio corresponding to each of the parts and an identity name of the user in the display unit.

In an embodiment of the invention, the behaviour analysis module further includes a marking module. The marking module performs a marking operation on each of the parts, so as to mark a read finish symbol or an unfinished symbol or an unread symbol on each of the parts.

According to the above descriptions, the reading time spent for reading each of the parts of the electronic document is recorded, so as to improve reading convenience. Moreover, based on eye-tracking, the user is unnecessary to manually perform the corresponding operation, which is very convenient.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5 is a schematic diagram of an eye area according to an embodiment of the invention.

FIG. 6A-FIG. 6C are schematic diagrams of three recording tables according to an embodiment of the invention.

DETAILED DESCRIPTION OF DISCLOSED EMBODIMENTS

Figure 1:
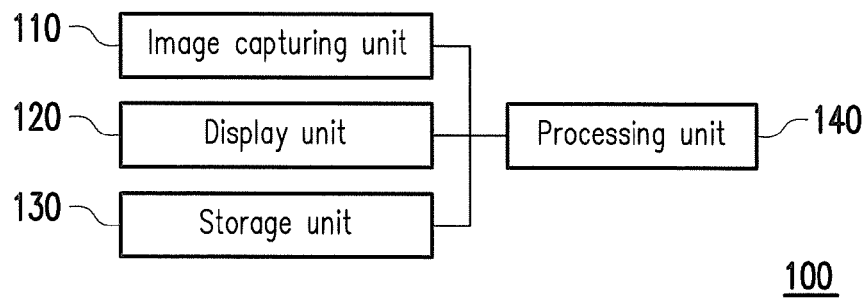
FIG. 1 is a block diagram of an apparatus for recording reading behaviour according to an embodiment of the invention.

FIG. 1 is a block diagram of an apparatus for recording reading behaviour according to an embodiment of the invention. Referring to FIG. 1, the apparatus 100 for recording reading behaviour includes an image capturing unit 110, a display unit 120, a storage unit 130 and a processing unit 140. The processing unit 140 is coupled to the image capturing unit 110, the display unit 120 and the storage unit 130.

The image capturing unit 110 is, for example, a video camera or a camera that has a charge coupled device (CCD) lens, a complementary metal oxide semiconductor transistor (CMOS) lens, or an infrared lens. The image capturing unit 110 is used for capturing an image sequence of the user.

The display unit 120 is, for example, a liquid-crystal display (LCD), a plasma display, a vacuum fluorescent display, a light-emitting diode (LED) display, a field emission display (FED) and/or other suitable displays, which is not limited by the invention.

The storage unit 130 is, for example, a fixed or movable random access memory (RAM) of any type, a read-only memory (ROM), a flash memory, a hard disk or other similar device or a combination of the above devices. The storage unit 130 includes a plurality of electronic documents, and temporarily stores the image sequence captured by the image capturing unit 110.

The processing unit 140 is, for example, a central processing unit (CPU), or a programmable general-purpose or special-purpose microprocessor, a digital signal processor (DSP), a programmable controller, an application specific integrated circuit (ASIC), a programmable logic device (PLD) or other similar devices or a combination of the above devices.

Figure 2:
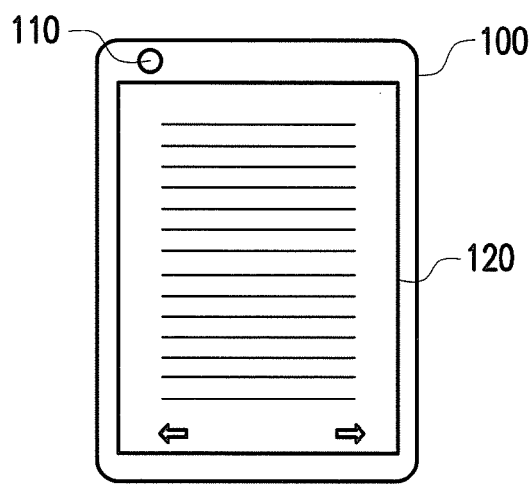
FIG. 2 is a schematic diagram of an apparatus for recording reading behaviour according to an embodiment of the invention.

The apparatus 100 for recording reading behaviour is, for example, an electronic apparatus such as a smart phone, a reader, a tablet PC, a personal computer, etc. For example, FIG. 2 is a schematic diagram of an apparatus for recording reading behaviour according to an embodiment of the invention. In FIG. 2, the apparatus 100 for recording reading behaviour is a reader, and the image capturing unit 110 (for example, a front camera) is disposed at a side having the display unit 120 (for example, a touch screen). The display unit 120 displays an electronic document, and the image capturing unit 110 captures the image sequence. Thereafter, the processing unit 140 performs an eye-tracking procedure on the captured image sequence to detect a movement trajectory of an eye of the user, so as to determine whether the user currently gazes the electronic document or determine a gazing position of the electronic document according to the movement trajectory of the eye.

In an actual application, the storage unit 130 includes a computer program used for recording reading behaviour. The computer program is composed of a plurality of program instructions (for example, an organization chart establishing program instruction, a table approving program instruction, a setting program instruction, and a deployment program instruction, etc), and these program instructions are loaded into the mobile device and executed by the same to accomplish various steps of a method for recording reading behaviour and various functions of the apparatus 100 for recording reading behaviour described above.

Figure 3:
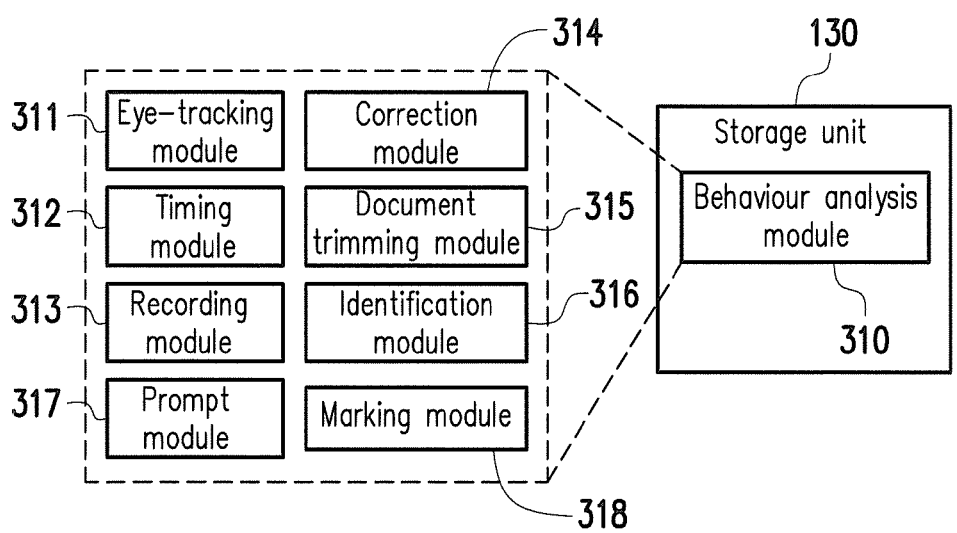
FIG. 3 is a block diagram of a storage unit according to an embodiment of the invention.

For example, FIG. 3 is a block diagram of a storage unit according to an embodiment of the invention. Referring to FIG. 3, the storage unit 130 includes a behaviour analysis module 310 used for executing the method for recording reading behaviour. The behaviour analysis module 310 is, for example, a program instruction written by a computer programming language, and the program instruction includes a plurality of commands. The processing unit 140 can execute the program instruction to implement recording the behaviour that the user reads the electronic document based on eye-tracking.

The behaviour analysis module 310 includes an eye-tracking module 311, a timing module 312, a recording module 313, a correction module 314, a document trimming module 315, an identification module 316, a prompt module 317 and a marking module 318. It should be noticed that the above modules included in the behaviour analysis module 310 are only used as an example, and the invention is not limited thereto.

The eye-tracking module 311 is configured to execute an eye-tracking procedure on the image sequence to track a movement trajectory of the eye of the user. The timing module 312 is configured to calculate a reading time of each of the parts. The recording module 313 is configured to record the reading time to a corresponding storage space. The correction module 314 is configured to perform a correction procedure before the eye-tracking procedure is performed. The document trimming module 315 is configured to determine whether reading of each of the parts is finished and calculate a read ratio according to sight landing coordinates of the eye. The identification module 316 is configured to identify an identity of the user currently using the apparatus 100 for recording reading behaviour. The prompt module 317 is configured to display related information of reading behaviour of each of the parts in the display unit 120. The marking module 318 is configured to mark each of the parts, so as to mark a read finish symbol or an unfinished symbol or an unread symbol on each of the parts.

Figure 4:
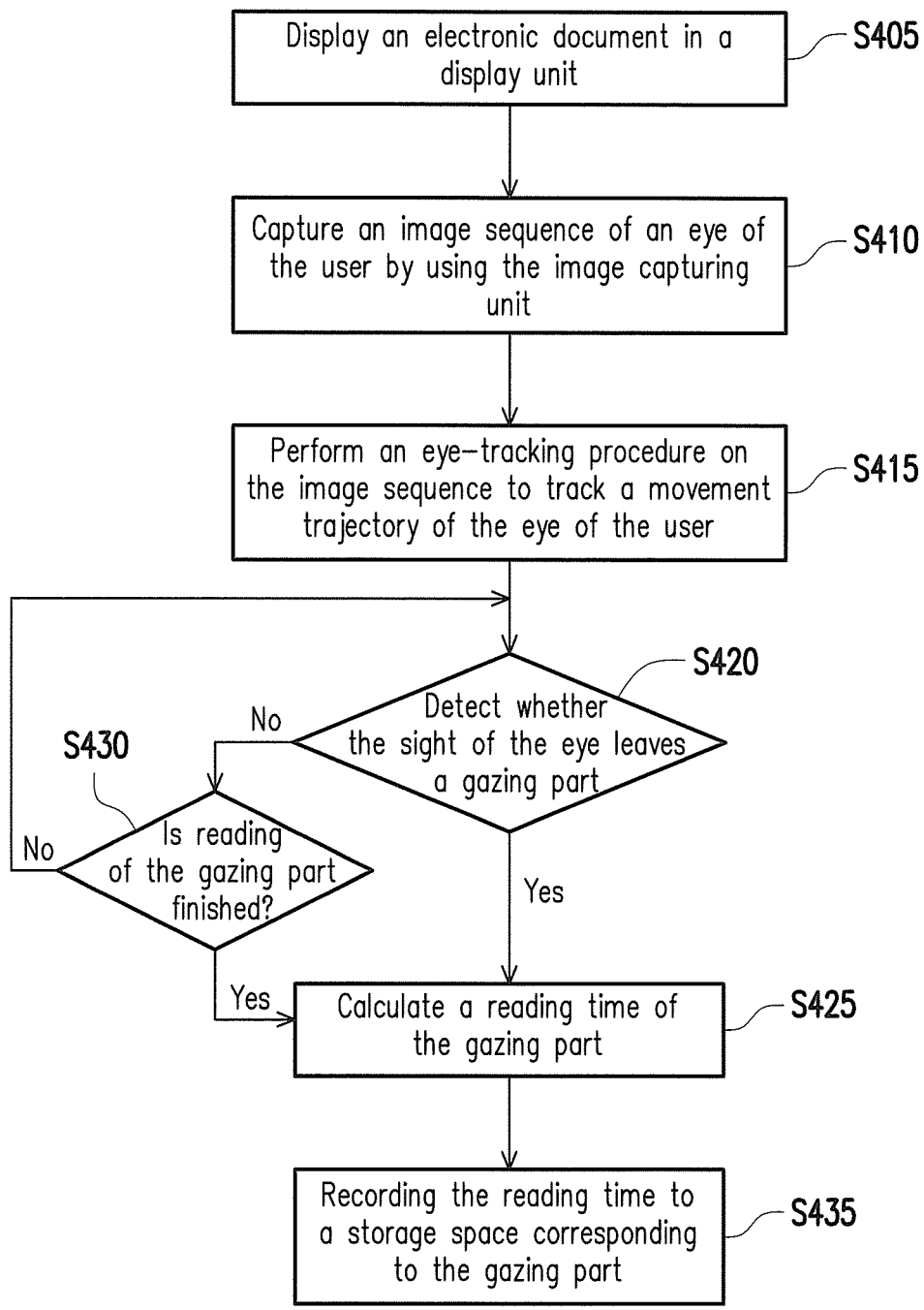
FIG. 4 is a flowchart illustrating a method for recording reading behaviour according to an embodiment of the invention.

Various steps of the method for recording reading behaviour are described in detail below with reference of FIG. 1 and FIG. 3. FIG. 4 is a flowchart illustrating a method for recording reading behaviour according to an embodiment of the invention. Referring to FIG. 1, FIG. 3 and FIG. 4, in step S405, an electronic document is displayed in the display unit 120. Here, the electronic document includes a plurality of parts, and the parts are, for example, chapters, paragraphs, sections, etc. The user can read the electronic document through the apparatus 100.

Then, in step S410, the image capturing unit 110 is used to capture the image sequence of the user. For example, the image capturing unit 110 is a front camera, which is used for capturing face images of the user, or the image capturing unit 110 has been adjusted and can be used to directly capture images of the eye of the user.

Then, in step S415, the processing unit 140 performs the eye-tracking procedure on the image sequence to track a movement trajectory of the eye of the user. The eye-tracking procedure is used for measuring a position of the eye and eye movement information. The current eye-tracking includes obtaining the position of the eye through a video capturing device, a search coil or based on an electrooculogram, etc.

For example, before the position of the eye is detected, the correction module 314 executes a correction procedure. The correction module 314 sequentially receives a plurality of correction images. Here, the correction images are obtained when the user views a plurality of correction points of the display unit 120. For example, 4 points located at top left, top right, bottom left and bottom right of the display unit 120 are taken as the correction points. When the correction procedure is performed, the user is prompted to view the aforementioned 4 correction points, so as to obtain 4 correction images. The correction module 314 obtains a reference correction parameter according to two bright spot positions in an eye area of each of the correction images.

Figures 5, 6A:
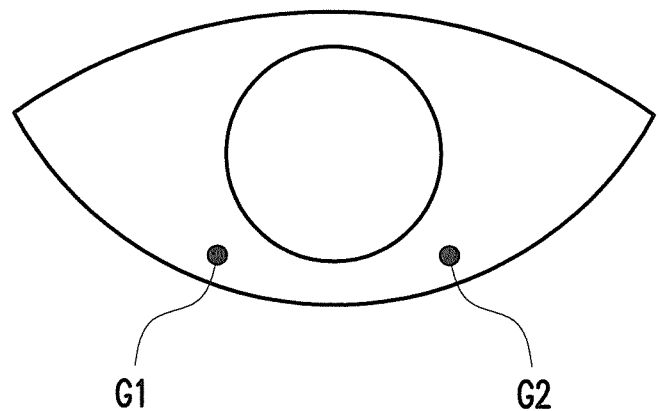

For example, FIG. 5 is a schematic diagram of an eye area according to an embodiment of the invention. FIG. 5 includes two bright spot positions G1 and G2. The two bright spots G1 and G2 are caused by light reflected by the eye, where the light is sent by a light emitting module configured in the image capturing unit 110. The reference correction parameter is obtained according to the two bright spot positions G1 and G2 in each of the correction images. The reference correction parameter is, for example, a vector based on the two bright spot positions G1 and G2. Then, the correction module 314 generates a coordinate transformation matrix through a perspective transformation method based on the correction image, where the coordinate transformation matrix is used for transforming a coordinate position of the eye area into a coordinate position of the display unit 120.

The eye-tracking module 311 detects the eye area of the current image in the image sequence to obtain a pupil position and the two bright spot positions (which are referred to as bright spot positions G1' and G2') in the current image. Moreover, the eye-tracking module 311 obtains a comparison correction parameter according to the bright spot positions G1' and G2' of the current image, and further obtains a dynamic compensation parameter (C3) according to the reference correction parameter (C1) and the comparison correction parameter (C2). For example, the dynamic compensation parameter is a ratio between the reference correction parameter and the comparison correction parameter, i.e. C3=C2/C1. Thereafter, the eye-tracking module 311 calculates eye movement coordinates according to the bright spot position G1' (or the bright spot position G2'), the pupil position (for example, coordinates of a center of the pupil) and the dynamic compensation parameter in the current image. For example, the eye movement coordinates are (X', Y'). The eye-tracking module 311 converts the eye movement coordinates (X', Y') into sight landing coordinates (for example, the sight landing coordinates are (Xs, Ys)) corresponding to the display unit 120 by using the coordinate transformation matrix. Then, the sight landing coordinates (Xs, Ys) are recorded. In this way, the movement trajectory of the eye is obtained according to a plurality of recorded sight landing coordinates.

Then, in step S420, the processing unit 140 detects whether the sight of the eye leaves one of the parts that is currently gazed. Namely, when the eye-tracking module 311 detects that the eye is gazing one of the parts (which is referred to as a gazing part hereinafter) in the electronic document, the eye-tracking module 311 further detects whether the sight of the eye leaves the gazing part. For example, the eye-tracking module 311 detects whether the sight of the eye leaves or still gazes the gazing part according to the obtained sight landing coordinates.

When it is detected that the sight of the eye leaves the gazing part, in step S425, the timing module 312 calculates a reading time of the gazing part. Then, in step S435, the recording module 313 records the reading time to a storage space corresponding to the gazing part. For example, a database (or a table) is configured in the storage unit 130, and in the database, a storage space (or a field) corresponding to each of the parts of the electronic document is configured.

For example, if the user starts reading the gazing part from an initial position, the recorded reading time is a time required when the sight moves from the initial position to a sight landing position where the sight finally stays. For another example, if the user starts reading the gazing part from a position other than the initial position, the timing module 312 further reads a previously recorded reading time, and adds the currently calculated reading time and the previously recorded reading time to obtain the reading time of the gazing part.

Moreover, after the step S420, when it is detected that the sight of the eye leaves the gazing part, and reading of the gazing part is not finished, the document trimming module 315 can calculate a current read ratio of the gazing part according to the sight landing coordinates where the sight of the eye finally stays. Moreover, the recording module 313 records the current read ratio of the gazing part and the sight landing coordinates where the sight of the eye finally stays to the storage space corresponding to the gazing part.

On the other hand, when it is detected that the sight of the eye keeps gazing the gazing part, in step S430, it is further determined whether reading of the gazing part is finished. For example, the document trimming module 315 determines whether reading of the gazing part is finished according to the sight landing coordinates. For example, when the electronic document is input to the apparatus 100 for recording reading behaviour, the document trimming module 315 can be used to analyze the parts (for example, chapters) included in the electronic document, and record an initial position and an end position of each of the chapters. In this way, after the document trimming module 315 obtains the sight landing coordinates, the document trimming module 315 can determine whether reading of the gazing part is finished.

When it is detected that the eye keeps gazing the electronic document, and reading of the gazing part is finished, in step S420, the timing module 312 calculates the reading time of the gazing part. Now, the calculated reading time is, for example, the total reading time of the gazing part. For example, the timing module 312 reads the reading time recorded in the storage space corresponding to the gazing part, and sums all of the reading time (the total reading time) of the gazing part according to the recorded reading time.

When reading of the gazing part is finished, and another part is gazed, the timing module 312 recounts the reading time. For example, when it is detected that the sight of the eye leaves the other part or reading of the other part is finished, the reading time of the other part is calculated. Moreover, the recording module 313 further records reading frequency of each of the parts. Alternatively, the recording module 313 records the reading frequency of the electronic document.

It should be noticed that the identification module 316 can be used to identify an identity of the user. For example, a database that stores identification information of the user is configured in the storage unit 130. The identification module 316 identifies the identity of the user by using a pupil identification technique, and determines whether the identification information corresponding to the user exists in the database. When the identification information corresponding to the user does not exist in the database, the identification information is recorded and the storage space corresponding to the identification information is created.

Thereafter, the prompt module 317 can be used to display the reading time, a read ratio corresponding to each of the parts and an identity name of the user in the display unit 120. For example, a table can be used to display the aforementioned information. Three examples of presenting a reading status of each of the parts of the electronic document are described below. FIG. 6A-FIG. 6C are schematic diagrams of three recording tables according to an embodiment of the invention.

In the recording table 610 of FIG. 6A, a single user is taken as an example, and graphic symbols are used to indicate each of the parts to be "read finish", "unfinished" or "unread". The recording table 610 includes three fields 611, 612 and 613, where the field 611 lists the parts (for example, chapters), and the field 612 lists a reading status of each of the chapters. In the present embodiment, symbols M1, M2 (a pie chart is used to present the read ratio) and M3 respectively represent "read finish", "unfinished" or "unread". The field 613 lists the reading time of each of the chapters. Where, a fourth chapter is unread.

The recording table 620 of FIG. 6B further lists the identity names of the users viewing each of the chapters, and the reading status of each chapter is presented in percentage instead of the graphic symbol. Besides the fields 611, 612 and 613, the recording table 620 further includes a field 621. The field 621 is used for recording the users that view each of the chapters. As that shown in FIG. 6B, the first, the second and the third chapters are respectively read by user "A", user "B" and user "C". For example, when the identification module 316 identifies that the user currently browsing the electronic document is identified for the first time (none corresponding identification information is in the database), the identification module 316 may ask the user to input an identify name such as a corresponding name, code or nickname, etc., and fills the identify name in the corresponding chapter of the field 621.

Moreover, in the recording table 630 of FIG. 6C, different tag pages are created for different users. Taking 4 tag pages 631-634 as an example, the tag page 631 corresponds to the user "A", the tag page 632 corresponds to the user "B", the tag page 633 corresponds to the user "C", and the tag page 634 corresponds to the user "D". Each of the tag pages includes fields 611-613.

In summary, according to the aforementioned embodiments, the image capturing unit is used to capture the eye of the user, and the sight landing coordinates of the eye are tracked by using the eye-tracking procedure, so as to determine whether reading of the current gazing part is finished, and the reading time is further recorded when the sight leaves the electronic document. Moreover, the reading time respectively spent on viewing each of the parts of the electronic document by different users can be recorded.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A method for recording reading behaviour, comprising:
performing a correction procedure before an eye tracking procedure is executed, wherein the correction procedure comprises sequentially receiving a plurality of correction images, obtaining a reference correction parameter according to two bright spot positions in an eye area of each of the correction images, and generating a coordinate transformation matrix according to the correction images;

displaying an electronic document on a display unit, wherein the electronic document comprises a plurality of parts;

capturing an image sequence of a user through an image capturing unit;

executing the eye-tracking procedure on the image sequence to track a movement trajectory of an eye of the user, wherein the step of tracking the movement trajectory of the eye of the user comprises:

detecting the eye area of a current image in the image sequence to obtain a pupil position in the current image;

obtaining a comparison correction parameter according to the two bright spot positions in the eye area of the current image;

obtaining a dynamic compensation parameter according to the reference correction parameter and the comparison correction parameter;

calculating eye movement coordinates according to one of the two bright spot positions and the pupil position in the current image and the dynamic compensation parameter;

converting the eye movement coordinates into sight landing coordinates corresponding to the display unit by using the coordinate transformation matrix; and recording the sight landing coordinates;

detecting whether a sight of the eye leaves a gazing part when it is detected that the eye gazes the gazing part of the parts;

calculating a reading time of the gazing part when it is detected that the sight of the eye leaves the gazing part, wherein the reading time is a time required for the sight moving from a position where the sight starts to gaze the gazing part to a position where the sight leaves the gazing part;

calculating the reading time of the gazing part when it is detected that the eye keeps gazing the electronic document and reading of the gazing part is finished; and recording the reading time to a storage space corresponding to the gazing part.

2. The method for recording reading behaviour as claimed in claim 1, wherein
the correction images are respectively obtained when the user views a plurality of correction points of the display unit;
the two bright spot positions are formed when the image capturing unit captures each of the correction images; and
the coordinate transformation matrix is used for transforming a coordinate position of the eye area into a coordinate position of the display unit.

3. The method for recording reading behaviour as claimed in claim 1, further comprising:
recording a current read ratio of the gazing part and sight landing coordinates where the sight of the eye finally stays to the storage space corresponding to the gazing part when it is detected that the sight of the eye leaves the gazing part, and reading of the gazing part is not finished.

4. The method for recording reading behaviour as claimed in claim 3, further comprising:
performing a marking operation on each of the parts according to the read ratio, so as to mark a read finish symbol or an unfinished symbol or an unread symbol on each of the parts.

5. The method for recording reading behaviour as claimed in claim 1, wherein the step of calculating the reading time of the gazing part when it is detected that the eye keeps gazing the electronic document and reading of the gazing part is finished comprises:
summing all of the reading time of the gazing part according to the recorded reading time read from the storage space corresponding to the gazing part.

6. The method for recording reading behaviour as claimed in claim 1, further comprising:
recording reading frequency of each part.

7. The method for recording reading behaviour as claimed in claim 1, wherein after the step of displaying the electronic document on the display unit, the method further comprises:
identifying an identity of the user;
determining whether identification information corresponding to the user exists in a database; and
recording the identification information and establishing the storage space corresponding to the identification information when the identification information corresponding to the user does not exist in the database.

8. The method for recording reading behaviour as claimed in claim 7, further comprising:
displaying the reading time, a read ratio corresponding to each of the parts and an identity name of the user in the display unit.

9. An apparatus for recording reading behaviour, comprising:
a display unit, displaying an electronic document, wherein the electronic document comprises a plurality of parts;
an image capturing unit, capturing an image sequence of a user;
a storage unit, storing the electronic document and the image sequence; and
a processing unit, coupled to the display unit, the image capturing unit and the storage unit, wherein the storage unit further stores a behaviour analysis module, driven by the processing unit,
wherein the behaviour analysis module comprises a correction module, wherein the correction module sequentially receives a plurality of correction images, obtains a reference correction parameter according to two bright spot positions in an eye area of each of the correction images, and generates a coordinate transformation matrix based on the correction images according to a perspective transformation method,
wherein the behaviour analysis module further comprises an eye-tracking module, executing an eye-tracking procedure on the image sequence to track the movement trajectory of the eye of the user, wherein the eye-tracking module detects the eye area of a current image in the image sequence to obtain a pupil position in the current image; obtains a comparison correction parameter according to the two bright spot positions in the eye area of the current image; obtains a dynamic compensation parameter according to the reference correction parameter and the comparison correction parameter; calculates eye movement coordinates according to one of the two bright spot positions and the pupil position in the current image and the dynamic compensation parameter; converts the eye movement coordinates into sight landing coordinates corresponding to the display unit by using the coordinate transformation matrix, and records the sight landing coordinates;

wherein when the processing unit detects that the eye gazes a gazing part of the parts, the processing unit detects whether a sight of the eye leaves the gazing part;

when the processing unit detects that the sight of the eye leaves the gazing part, the processing unit calculates a reading time of the gazing part, and records the reading time to a storage space corresponding to the gazing part, wherein the reading time is a time required for the sight moving from a position where the sight starts to gaze the gazing part to a position where the sight leaves the gazing part;

when the processing unit detects that the eye keeps gazing the electronic document and reading of the gazing part is finished, the processing unit calculates the reading time of the gazing part, and records the reading time to a storage space corresponding to the gazing part.

10. The apparatus for recording reading behaviour as claimed in claim 9, wherein
the behaviour analysis module further comprises:
a timing module, calculates the reading time; and
a recording module, recording the reading time.

11. The apparatus for recording reading behaviour as claimed in claim 10
wherein the correction images are respectively obtained when the user views a plurality of correction points of the display unit, the two bright spot positions are formed when the image capturing unit captures each of the correction images, and the coordinate transformation matrix is used for transforming a coordinate position of the eye area into a coordinate position of the display unit.

12. The apparatus for recording reading behaviour as claimed in claim 10, wherein the behaviour analysis module further comprises:
a document trimming module, calculating a current read ratio of the gazing part according to sight landing coordinates where the sight of the eye finally stays;
wherein the recording module further records the current read ratio of the gazing part and the sight landing coordinates where the sight of the eye finally stays to the storage space corresponding to the gazing part when it is detected that the sight of the eye leaves the gazing part, and reading of the gazing part is not finished.

13. The apparatus for recording reading behaviour as claimed in claim 12, wherein the document trimming module determines whether reading of the gazing part is finished according to the sight landing coordinates,
wherein when it is detected that the eye keeps gazing the electronic document, and reading of the gazing part is finished, the timing module sums all of the reading time of the gazing part according to the recorded reading time.

14. The apparatus for recording reading behaviour as claimed in claim 12, wherein the recording module further records reading frequency of each part.

15. The apparatus for recording reading behaviour as claimed in claim 10, wherein the behaviour analysis module further comprises:
an identification module, identifying an identity of the user, and determining whether identification information corresponding to the user exists in a database,
wherein when the identification information corresponding to the user does not exist in the database, the identification module records the identification information and establishes the storage space corresponding to the identification information.

16. The apparatus for recording reading behaviour as claimed in claim 15, wherein the behaviour analysis module further comprises:
a prompt module, displaying the reading time, a read ratio corresponding to each of the parts and an identity name of the user in the display unit.

17. The apparatus for recording reading behaviour as claimed in claim 10, wherein the behaviour analysis module further comprises:
a marking module, performing a marking operation on each of the parts, so as to mark a read finish symbol or an unfinished symbol or an unread symbol on each of the parts.

* * * * *